(12) United States Patent
Stählin

(10) Patent No.: US 11,336,656 B2
(45) Date of Patent: May 17, 2022

(54) VERIFICATION APPARATUS, VEHICLE-TO-X COMMUNICATION DEVICE, METHOD AND USE

(71) Applicant: Continental Automotive Systems, Inc., Auburn Hills, MI (US)

(72) Inventor: Ulrich Stählin, Rochester, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 376 days.

(21) Appl. No.: 16/583,566

(22) Filed: Sep. 26, 2019

(65) Prior Publication Data

US 2021/0099463 A1 Apr. 1, 2021

(51) Int. Cl.
*H04L 29/06* (2006.01)
*H04W 4/44* (2018.01)
*G01K 1/024* (2021.01)

(52) U.S. Cl.
CPC ............. *H04L 63/12* (2013.01); *G01K 1/024* (2013.01); *H04W 4/44* (2018.02)

(58) Field of Classification Search
CPC .......... H04L 63/12; H04W 4/44; G01K 1/024
USPC ........................................................ 713/161
See application file for complete search history.

(56) References Cited

U.S. PATENT DOCUMENTS

| | | | |
|---|---|---|---|
| 2004/0068350 A1* | 4/2004 | Tomson | G01C 21/36 701/1 |
| 2006/0232697 A1* | 10/2006 | Ito | H04N 5/232123 348/345 |
| 2014/0020098 A1* | 1/2014 | Stahlin | G06F 21/33 726/22 |

* cited by examiner

*Primary Examiner* — Evans Desrosiers
(74) *Attorney, Agent, or Firm* — RatnerPrestia

(57) ABSTRACT

A verification apparatus for a vehicle-to-X (V2X) communication device, designed to verify received V2X messages and configured to conduct the verification of received V2X messages depending on a determined temperature value. A V2X communication device including the verification apparatus, a corresponding method and the use of the verification apparatus or communication device as also disclosed.

14 Claims, 2 Drawing Sheets

VERIFICATION APPARATUS, VEHICLE-TO-X COMMUNICATION DEVICE, METHOD AND USE

FIELD OF THE INVENTION

The present invention relates to a verification apparatus, a device for vehicle-to-X communication, a corresponding method and the use of the device and/or the verification apparatus.

BACKGROUND OF THE INVENTION

Due to the comparatively high frequency of, for example, 5.9 GHz that is provided for vehicle-to-X (V2X) communication, there is a fundamental effort to connect the V2X chipset, comprising the electronic components required to operate the V2X antenna and a computing apparatus for processing data to be received or transmitted via V2X communication, with the greatest possible spatial proximity and/or with the shortest possible signal transfer path to the antenna, so that interferences and/or line losses in this area of the transfer path can be minimized. Due to the typically high temperatures close to the antenna, the high-frequency components for transferring the V2X signals at close spatial proximity to the V2X chipset would however be exposed to a temperature that they are not compatible with.

SUMMARY OF THE INVENTION

An aspect of the invention is a means which overcomes the above problems, while at the same time enabling the desired short connection between the V2X chipset and the antenna.

An aspect of the invention describes a verification apparatus for a vehicle-to-X (V2X) communication device, designed to verify received V2X messages and configured to conduct the verification of received V2X messages depending on a determined temperature value. Verified received V2X messages are advantageously further processed by a computing apparatus of the V2X communication device and non-verified received V2X messages can for example be rejected and thus not processed further.

Here, it has been identified that a verification apparatus contributes significantly towards the self-heating of the V2X chipset of a V2X communication device. In general, the self-heating of the verification apparatus and thus the temperature development are significantly determined by the computing resources currently used or the computing capacity currently used of the verification apparatus. An aspect of the invention is thus based on the concept of achieving the above object by reducing the self-heating of the V2X chipset during ongoing operation by adapting the computing resources of the verification apparatus that are required for verifying received V2X messages.

In this way, a short connection between the V2X chipset and the antenna can be enabled, in particular without exposing the high-frequency components to a temperature that they are not compatible with. For example, in this way, shutting down the V2X communication device or parts of it, or reducing the transmission capacity in order to achieve a comparable effect, can be avoided. A scope of functions of a basic system, e.g. of a vehicle, which is dependent on information from the V2X communication, also does not need to be restricted, so that a user of the basic system does not have to experience restrictions in the scope of functions. In addition, increased costs for potential cooling measures in order to achieve a comparable effect can be avoided.

Here, the implementation of an embodiment of the invention does not depend on which of the components of the V2X communication device, in particular the V2X transceiver, computing apparatus for processing V2X messages to be transmitted and/or received or another chip that comprises or realizes the verification apparatus, since the components are usually surrounded by a shared housing of the V2X device and the temperature within the housing can be assumed to be essentially the same for the purposes of an aspect of the invention. As a supplement or as an alternative, the temperature value can be determined at a place or in a space that is of relevance to an aspect of the invention.

According to one embodiment, the verification apparatus is configured for adapting the computing resources of the verification apparatus used for the verification of the received V2X messages, depending on the determined temperature value.

According to one embodiment, the verification apparatus is configured for adapting the computing resources used for the verification of the received V2X messages, reciprocally relative to the determined temperature value. According to a further development, the computing resources used are thus adapted when the determined temperature value increases, such that the number of the received V2X messages to be verified is reduced. Accordingly, the computing resources used are adapted when the determined temperature value decreases, such that the number of the received V2X messages to be verified is increased.

According to one embodiment, the verification apparatus is configured to conduct the computing resources used for the verification of received V2X messages by changing the number of received V2X messages to be verified within a time interval, in relation to a total number of received V2X messages within the time interval.

According to one embodiment, the verification apparatus is configured to adapt the number of V2X messages received to be verified within a time interval, in relation to a total number of received V2X messages within the time interval, reciprocally relative to the temperature value to be determined.

According to one embodiment, the verification apparatus is configured to adapt the change in the number of received V2X messages to be verified within a time interval, in relation to a total number of received V2X messages within the time interval, by changing a verification pattern that has been implemented.

According to one embodiment, the verification apparatus is configured to implement a first verification pattern or a second verification pattern, wherein when implementing the first verification pattern, compared to the second verification pattern, a larger number of received V2X messages to be verified is verified within a time interval in relation to a total number of received V2X messages within the time interval, and wherein the verification apparatus is configured to switch from the implementation of the first verification pattern to the implementation in the second verification pattern, when a determined temperature value exceeds a specified, first temperature threshold value.

In particular, the first verification pattern thus primarily requires more resources compared to the second verification pattern, as a result of which the degree of self-heating is usually higher.

According to one embodiment, the verification apparatus is configured to switch to the first verification pattern when the temperature value falls below a specified second temperature threshold value. The first threshold value and the second temperature threshold value can here be identical and/or can relate to one corresponding temperature value. If the first temperature threshold value and the second temperature threshold value do not correspond, it is advantageous that the second temperature threshold value describe a lower temperature value compared to the first temperature threshold value. Temperature values that differ for the first and second temperature threshold value can if necessary be allowed to influence a frequency of a switchover between the first and the second verification pattern, wherein with increasing temperature value differences of the temperature threshold value, longer time periods can in particular result between the switchovers between the verification patterns.

According to a further development, the following is implementable as a first verification pattern by the verification apparatus:

the verification of all incoming V2X messages ("Verify All"), and the following is implementable as the first verification pattern or the second verification pattern:

the verification of only a portion of the incoming V2X messages, which fulfil one or more predetermined conditions ("Verify on Demand"), and/or the verification of incoming V2X messages on the basis of at least one other procedure related to the message content ("Smart Verify").

Restrictions with regard to the allocation of the respective implemented first and/or second verification pattern result are in particular due to the fact that the first verification pattern is that which that requires more resources compared to the second verification pattern. The verification patterns are realizable in different ways. For example, the selection of the V2X messages to be verified can be made on the basis of prioritization information, which can also be comprised by the V2X messages, wherein a temperature dependence of the verification in the sense of an aspect of the invention is implementable such that when the temperature increases, only V2X messages with a higher priority are verified.

According to a further development, the device is configured to determine the temperature value by means of a temperature recording apparatus and/or using at least one additional size value, at least of one physical size, which in particular is recordable by means of a measurement apparatus suitable for the purpose. The temperature value can thus for example be determined from one or more size values of one or more physical sizes. Advantageously, the size value or size values is or are related to the temperature at the relevant location or in the relevant space in a manner that can be depicted.

According to a further development, the verification device is configured to use a temperature and/or power consumption and/or current consumption of the verification apparatus to determine the temperature value. For example, a temperature can be determined using a computed power consumption, on the basis of a voltage and a current consumption of the V2X chipset or one or more components of it, when a relationship that can be depicted exists.

An aspect of the invention further relates to a vehicle-to-X (V2X) communication device, comprising a receiving apparatus for receiving V2X messages, e.g. comprising a V2X transceiver, a computing apparatus for processing received V2X messages and/or V2X messages to be sent, a temperature recording apparatus and a verification apparatus according to an embodiment of the invention. The computing apparatus can here also be used to implement a Software Defined Radio.

A computing apparatus can be any apparatus that is designed to process at least one of the above signals. For example, the computing apparatus can be a processor, an ASIC, an FPGA, a digital signal processor, a main processor (CPU, or Central Processing Unit), an MPP (Multi-Purpose Processor) or similar.

According to one embodiment of the V2X communication deice, the computing apparatus is configured to conduct the recording of the temperature value by means of the temperature recording apparatus and to trigger the verification apparatus in order to implement the method.

In a further development of the device described, the device described comprises a memory and a processor. Here, the method described is stored in the memory in the form of a computer program, and the processor is provided to implement the method when the computer program is loaded from the memory into the processor.

According to a further aspect of the invention, a computer program comprises program code titles in order to implement all steps of the method described when the computer program is implemented on a computer or one of the devices described.

According to a further aspect of the invention, a computer program product contains a program code which is stored on a data carrier which can be read by a computer, and which, when it is implemented on a data processing apparatus, implements one of the methods described.

An aspect of the invention further relates to the use of an embodiment of the verification apparatus and/or the V2X communication device according to an aspect of the invention in a vehicle in combination with an infrastructure apparatus.

The vehicle can be a motor vehicle, in particular a passenger vehicle, a truck, a motorbike, an electric motor vehicle or a hybrid motor vehicle, a watercraft or an aircraft.

Further, an aspect of the invention relates to a method that corresponds to the embodiments of the described verification apparatus, comprising the following steps:

receiving V2X messages by means of a receiving apparatus of a V2X communication device, recording a temperature value in relation to the V2X communication device, verifying the received V2X messages depending on the determined temperature value by means of a verification apparatus of the V2X communication device.

Further embodiments of the invention are described in the descriptions of the embodiments of the verification apparatus according to an aspect of the invention.

BRIEF DESCRIPTION OF THE DRAWINGS

Several particularly advantageous designs of aspects of the invention are given in the subclaims. Further preferred embodiments are also described in the description of exemplary embodiments below, with reference to drawings, which show the following in schematic form:

DETAILED DESCRIPTION OF THE PREFERRED EMBODIMENTS

Figure 1:
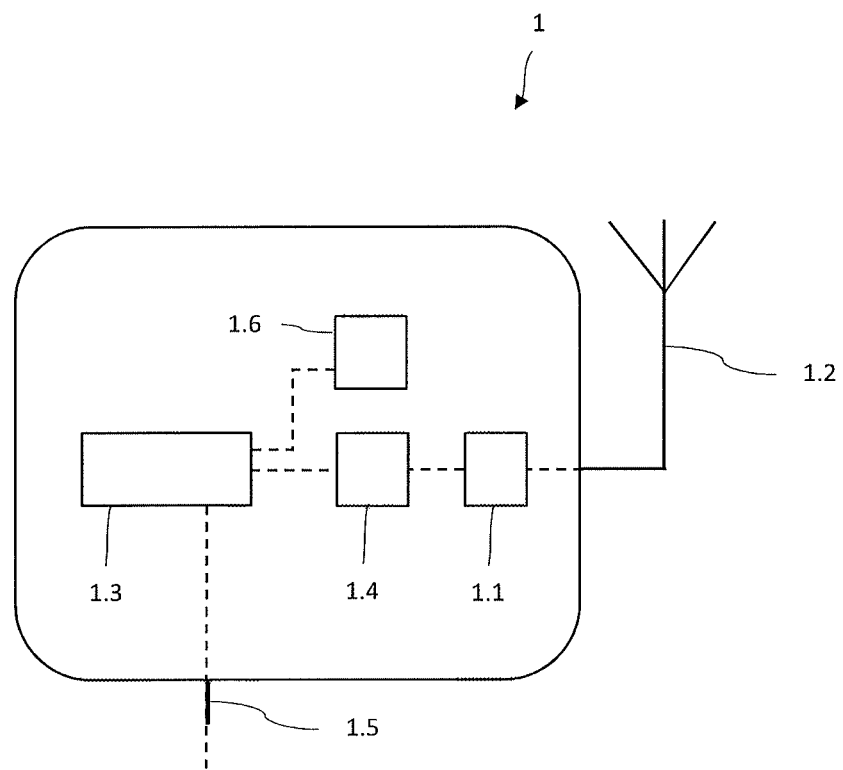
FIG. 1 shows an exemplary embodiment of the vehicle-to-X communication device according to an aspect of the invention, comprising an exemplary embodiment of the verification apparatus according to an aspect of the invention.

FIG. 1 shows an exemplary embodiment of the device 1 for vehicle-to-X (V2X) communication according to an aspect of the invention, comprising a receiving apparatus 1.1 for receiving V2X messages with an antenna 1.2, a computing apparatus 1.3 for processing V2X messages that are received and/or to be transmitted, and a verification apparatus 1.4 according to an embodiment of the invention. By means of a data transmission means 1.5, the V2X communication device can be designed for data communication with additional control facilities of additional systems, in particular of a vehicle. Furthermore, the V2X communication device 1 comprises a temperature recording apparatus 1.6 for recording a temperature value of the V2X communication device 1 and/or the verification apparatus 1.4. Here, the recording can be made by the computing apparatus 1.3 and/or the verification apparatus. Here, the temperature value can for example be determined by means of a temperature sensor and/or indirectly via the determination of the power consumption of the V2X communication device 1 or of the verification apparatus 1.4, which can correlate with the temperature within the housing of the V2X communication device 1, for example. The verification apparatus 1.2 is configured to verify the V2X messages received by means of the receiving apparatus 1.1, depending on the determined temperature value. In particular, here, the number of V2X messages to be verified is adapted depending on the temperature value, wherein in general, when the temperature increases, the self-heating of the verification apparatus is reduced, which advantageously is achieved by reducing the number of received V2X messages to be verified.

Figure 2:
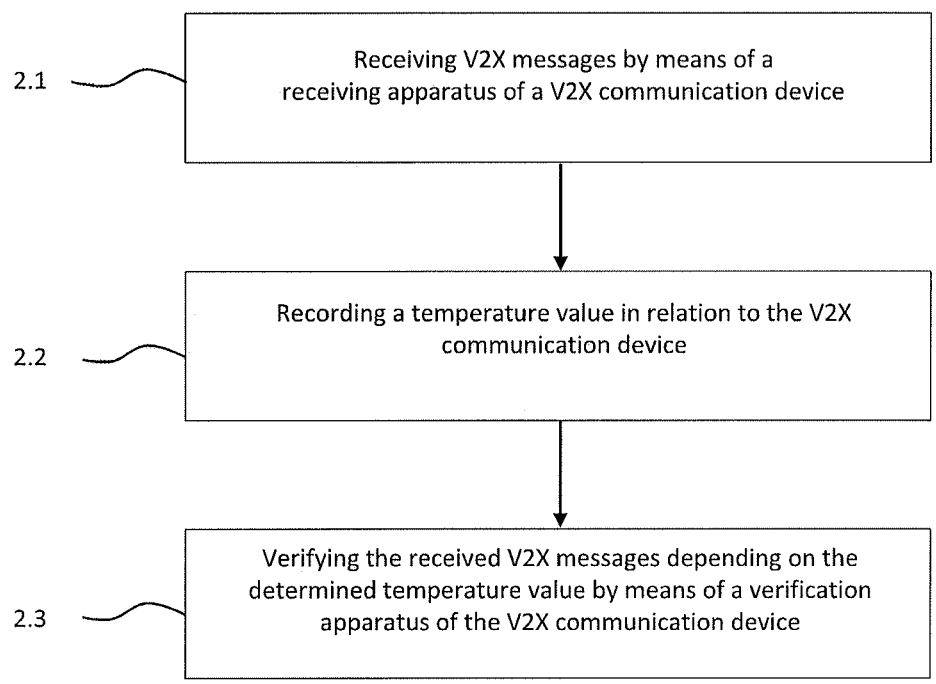
FIG. 2 shows an exemplary embodiment of the method according to an aspect of the invention.

FIG. 2 shows an exemplary body of the method according to an aspect of the invention in the form of a sequence diagram, wherein in a step 2.1, V2X messages are received by means of a receiving apparatus of a V2X communication device. In a step 2.2, a temperature value is recorded in relation to the V2X communication device by means of a temperature recording apparatus, and in a step 2.3, the received V2X messages are verified depending on the determined temperature value by means of a verification apparatus of the V2X communication device.

Insofar as it emerges during the course of the procedure that a feature or a group of features is not absolutely necessary, a formulation is already sought at this stage by the applicant of at least one independent claim, which no longer comprises the feature or group of features. This can for example be a sub-combination of a claim present on the day of application, or a sub-combination which is restricted by further features of a claim present on the day of application. Such claims or feature combinations to be newly formulated should be understood as being covered by the disclosure of this application.

Reference is further made to the fact that designs, features and variants of aspects of the invention which are described in the different embodiments or exemplary embodiments and/or shown in the figures can be combined with each other in any way desired. Individual or multiple features can be exchanged as required. Such claims or feature combinations thus created should be understood as being covered by the disclosure of this application.

References in dependent claims should not be understood as a waiver of the attainment of independent, concrete protection for the claims of the subclaims to which reference is made. These features can also be combined with other features as desired.

Features which are only disclosed in the description, or features which are only disclosed in the description or in a claim in connection with other features can in general be of independent importance of essence to aspects of the invention. They can therefore also be claimed individually as a differentiation from the prior art.

In general, reference is made to the fact that vehicle-to-X communication is in particular understood as being a direct communication between vehicles and/or between vehicles and infrastructure facilities. For example, it can therefore be vehicle-to-vehicle communication or vehicle-to-infrastructure communication. Insofar as reference is made within the scope of this application to a communication between vehicles, this can in general take place for example within the scope of vehicle-to-vehicle communication, which is typically conducted without mediation via a mobile communications network or a similar external infrastructure, and which is therefore different from other solutions such as those which are based on a mobile communications network. For example, a vehicle-to-X communication can be conducted using the IEEE 802.11p or IEEE 1609.4 or 4G or 5G standards, in particular also PC5 or sidelink. A vehicle-to-X communication can also be described as C2X communication or V2X communication. The partial areas can be described as C2C (car-to-car) or C2I (car-to-infrastructure), V2I (vehicle-to-infrastructure). An aspect of the invention expressly also includes vehicle-to-X communication with communication via a mobile phone network, for example, known as cellular-V2X or C-V2X.

The invention claimed is:

1. A verification apparatus for a vehicle-to-X (V2X) communication device, designed to:
   verify received V2X messages and configured to conduct the verification of received V2X messages depending on a determined temperature value; and
   implement a first verification pattern or a second verification pattern,
   wherein when implementing the first verification pattern, compared to the second verification pattern, a larger number of received V2X messages to be verified is verified within a time interval in relation to a total number of received V2X messages within the time interval, and
   wherein the verification apparatus is configured to switch from the implementation of the first verification pattern to the implementation in the second verification pattern, when a determined temperature value exceeds a specified, first temperature threshold value.

2. The verification apparatus according to claim 1, configured for adapting the computing resources of the verification apparatus used for the verification of the received V2X messages, depending on the determined temperature value.

3. The verification apparatus according to claim 2, configured for adapting the computing resources used for the verification of the received V2X messages, reciprocally relative to the determined temperature value.

4. The verification apparatus according to claim 3, configured to conduct the computing resources used for the verification of received V2X messages by changing the number of received V2X messages to be verified within a time interval, in relation to a total number of received V2X messages within the time interval.

5. The verification apparatus according to claim 2, configured to conduct the computing resources used for the verification of received V2X messages by changing the number of received V2X messages to be verified within a time interval, in relation to a total number of received V2X messages within the time interval.

6. The verification apparatus according to claim 1, configured to adapt the number of received V2X messages to be verified within a time interval, in relation to a total number of received V2X messages within the time interval, reciprocally relative to the temperature value to be determined.

7. The verification apparatus according to claim 1, configured to switch to the first verification pattern when the temperature value falls below a specified second temperature threshold value.

8. The verification apparatus according to claim 1, configured to determine the temperature value by a temperature recording apparatus and/or using at least one further size value of at least one physical size.

9. The verification apparatus according to claim 1, configured to use a temperature and/or power consumption and/or current consumption of the verification apparatus to determine the temperature value.

10. A vehicle-to-X communication device, comprising:
 a receiving apparatus for receiving V2X messages,
 a computing apparatus for processing received V2X messages and/or V2X messages to be sent,
 a temperature recording apparatus and
 a verification apparatus according to claim 1.

11. The use of the verification apparatus according to claim 10 in a vehicle or in combination with an infrastructure apparatus.

12. The use of the verification apparatus according to claim 1 in a vehicle or in combination with an infrastructure apparatus.

13. A verification apparatus for a vehicle-to-X (V2X) communication device, designed to:
 verify received V2X messages and configured to conduct the verification of received V2X messages depending on a determined temperature value; and
 adapt a change in the number of received V2X messages to be verified within a time interval, in relation to a total number of received V2X messages within the time interval, by changing a verification pattern that has been implemented,
 wherein the following is implementable as the first verification pattern:
  the verification of all incoming V2X messages, and
 the following is implementable as the first verification pattern or the second verification pattern:
  the verification of only a portion of the incoming V2X messages, which fulfil one or more predetermined conditions, and/or
  the verification of incoming V2X messages on the basis of at least one other procedure related to the message content.

14. A method comprising:
 receiving V2X messages by a receiving apparatus of a V2X communication device;
 recording a temperature value in relation to the V2X communication device;
 verifying the received V2X messages and conducting the verification of received V2X messages depending on a determined temperature value; and
 implementing a first verification pattern or a second verification pattern,
 wherein when implementing the first verification pattern, compared to the second verification pattern, a larger number of received V2X messages to be verified is verified within a time interval in relation to a total number of received V2X messages within the time interval, and wherein the verification apparatus is configured to switch from the implementation of the first verification pattern to the implementation in the second verification pattern, when a determined temperature value exceeds a specified, first temperature threshold value.

* * * * *